March 17, 1964 J. C. MILLER 3,125,689

TUNNEL DIODE LOGIC CIRCUITS EMPLOYING A SINGLE TUNNEL DIODE FOR RESET

Filed Sept. 14, 1960 2 Sheets-Sheet 1

INVENTOR.
James C. Miller

BY Carl V. Olson

Attorney

INVENTOR.
James C. Miller
BY
Carl V. Olson
Attorney 3,125,689

TUNNEL DIODE LOGIC CIRCUITS EMPLOYING A SINGLE TUNNEL DIODE FOR RESET

James C. Miller, Hamilton Square, N.J., assignor to Radio Corporation of America, a corporation of Delaware Filed Sept. 14, 1960, Ser. No. 55,876
15 Claims. (Cl. 307—88.5)

This invention relates to logic circuit systems of the type employed in computer and data processing apparatus, and more particularly to arrangements for resetting bistable logic circuits including negative resistance diodes (viz., tunnel diodes) in very high speed systems.

Negative resistance diodes, such as tunnel diodes, are useful in logic systems, for example, because of the very high speed with which they can be switched between two operating states. After a binary information signal has been applied to the tunnel diode and caused it to switch from one state to the other, it is often necessary to reset the tunnel diode to the original state so that it will be ready to react to the next following binary information signal. There are two general types of reset systems: the synchronous system wherein the resetting is performed periodically in response to a resetting "clock" wave; and the asynchronous system wherein resetting is performed only when needed.

One form of synchronous operation involves the applying of periodic bias voltage pulses to cascaded tunnel diode logic circuits in time sequence at a rate corresponding with and controlling the flow of binary information signals through the cascaded circuits. The tunnel diodes are automatically reset at the end of each bias pulse. The application of properly timed bias pulses, called clock pulses, to the very great number of tunnel diode logic circuits in a computer presents a serious problem of distribution because of the high frequency involved (such as 200 megacycles) and the necessity for accurate maintenance of pulse shape and phase relationships.

Another form of synchronous operation involves the use of bistable tunnel diode circuits in a system wherein the tunnel diode is continuously biased from a direct current source, is switched from one state to the other by the binary information signal, and is returned to the original state by a reset or clock pulse. This arrangement requires both a direct current bias source and a reset or clock pulse source. The distribution of the high frequency reset pulses to a large number of logic circuits presents the same great difficulties as the distribution of bias pulses in the previously described arrangement.

Turning now to asynchronous operation, one such system employs tunnel diodes biased to be monostable, i.e., to always return to the initial state when the input signal is removed. The binary information signal coupling between successive tunnel diode circuits may be made unilateral by means of conduction diodes. A disadvantage attendant upon the use of a monostable circuit is that an appreciable "recovery time" elapses after the circuit is switched before it can again be switched. Also, the use of monostable circuits is not free of timing difficulties, which result from the different delays of signals passing through the system over different paths. The delays are due to the sequential switching of the successive circuits and the delays often cannot be compensated for in the circuit design because the delays vary with signal conditions. It is therefore often necessary, when using monostable logic circuits, to employ some form of timing or clock signal to insure the proper flow of binary information signals through the system.

A second form of asynchronous operation involves the generation of a reset pulse for application to a bistable tunnel diode logic circuit whenever the circuit has completed its response to a binary information signal, the following stages have utilized its output, and it should be reset to be ready for the next succeeding binary information signal. This arrangement is known as employing a logically derived reset signal, rather than a clock reset signal.

It is an object of this invention to provide an improved negative resistance diode logic circuit system which is operable at very high speeds and which provides synchronous operation while avoiding or minimizing the problems attendant upon the distribution of reset clock pulses to a large number of diode logic circuits.

It is another object of the invention to provide an improved system of bistable tunnel diode logic circuits and automatic reset circuits.

It is a further object to provide improved combination tunnel diode logic and reset circuits.

In one aspect the invention comprises a logic system made up of a large number of tunnel diode logic circuits which are biased by a direct current source to operate in a bistabe manner and switch from one state to the other in response to binary information signals. Each group or block of several tunnel diode logic circuits is periodically reset to the original state by means of a reset diode, which may be a gallium arsenide tunnel diode. A reset or clock source supplies a high frequency sinusoidal wave to all of the reset diodes to switch them from one state to the other and thereby generate sharp reset pulses which are coupled through individual coupling diodes to the logic circuits.

The arrangement is one wherein a reset diode is located in the immediate vicinity of the group or block of logic circuits which it resets. The problem of distributing a high frequency, shaped reset pulse is avoided. The alternating current reset or clock wave is easily distributed to the reset diodes throughout the computer because it is a simple sinusoidal wave of one frequency.

In another aspect the invention comprises the combination of a bistable tunnel diode logic circuit, and a reset tunnel diode circuit coupled through a coupling diode to the logic circuit. The reset tunnel diode circuit may be actuated by a periodic reset wave or by logically derived reset pulses.

These and other objects and aspects of the invention will be apparent from the following more detailed description taken in conjunction with the appended drawings, wherein.

Figures 1, 4:
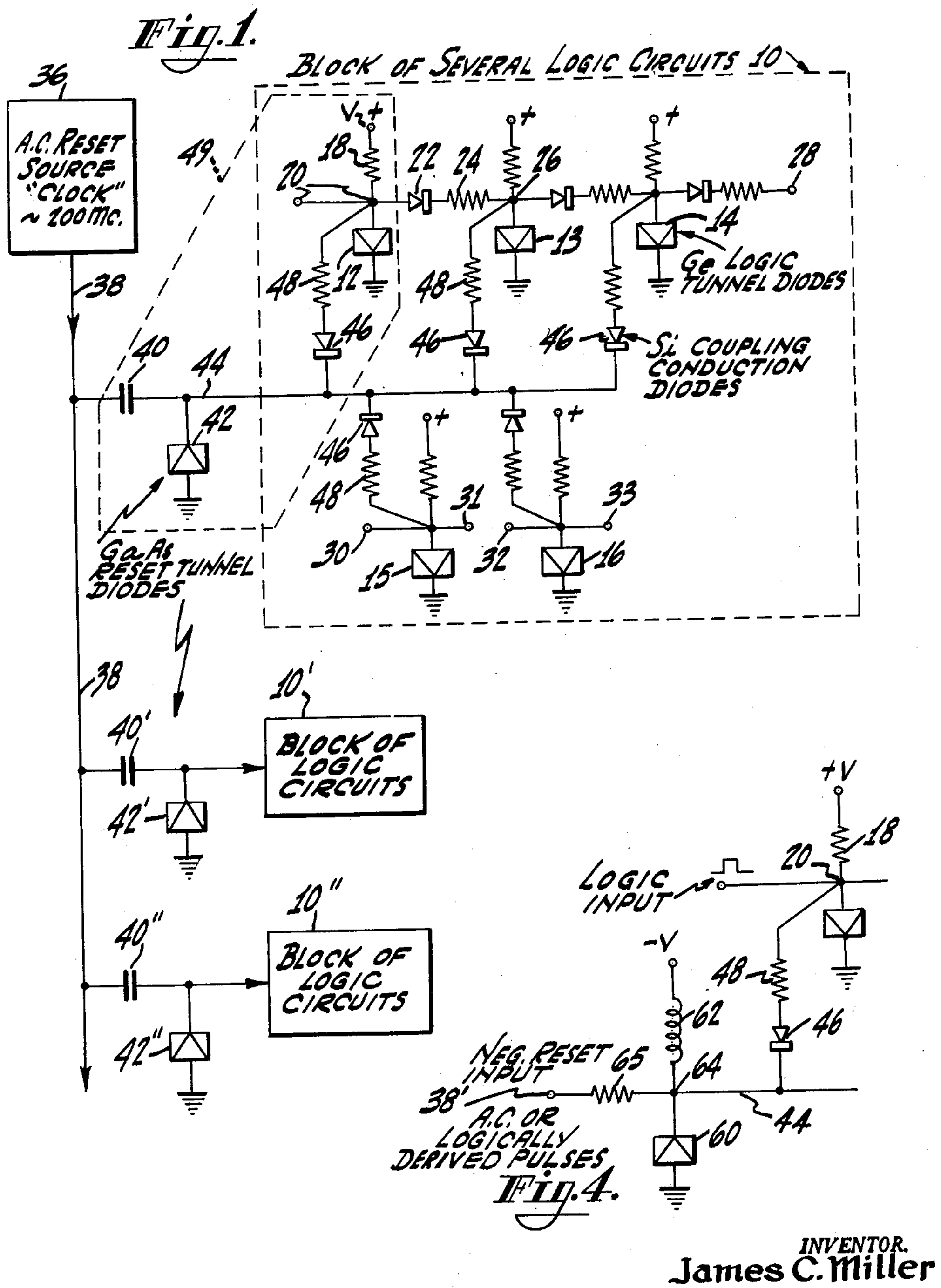
FIGURE 1 is a simplified diagrammatic representation of a portion of a computer including logic circuits which are bistable tunnel diode circuits and which are periodically reset in a manner in accordance with the teachings of the invention.
FIGURE 4 is a diagram of a tunnel diode logic and reset circuit which may be substituted for the corresponding circuit in the system of FIGURE 1.

Reference will now be made to FIGURE 1 which shows a simplified portion of the computer or data processing apparatus designed for very high speed operation and including tunnel diode logic circuits. The logic circuits are capable of one cycle of operation in a time such as one hundredth or one thousandth of a microsecond.

A group or block of several logic circuits includes several similar tunnel diodes 12 through 16, which preferably are germanium tunnel diodes. The tunnel diodes are biased from a direct current source (not shown) having a positive terminal V with respect to ground or other point of reference potential. The direct current bias is applied to the tunnel diode 12 through a resistor 18. The tunnel diode 12 is provided with a signal input terminal 20 to which a binary information signal is applied to cause the diode 12 to switch from one stable voltage state to the other. For simplicity, each diode logic stage is shown with a single input terminal. It is understood, however, that a diode logic stage may receive a number of separate input signals. The output of the tunnel diode 12 is applied through a unidirectional interstage diode 22, which preferably is a germanium conduction diode or a germanium tunnel rectifier, and a coupling resistor 24 to the input (and output) terminal 26 of the similar tunnel diode logic circuit including the tunnel diode 13. The output of the logic circuit including tunnel diode 13 is similarly coupled to the logic circuit including tunnel diode 14. The logic circuit including tunnel diode 14 has an output terminal 28. It is thus apparent that the logic circuits including tunnel diodes 12, 13 and 14 are connected in cascade, and that interstage diodes 22 are employed between the logic circuits to provide a unilateral flow of binary information signals from tunnel diode 12 to tunnel diode 13 to tunnel diode 14.

Tunnel diodes 15 and 16 are similarly connected as logic circuits with the difference that they are not coupled together for signal handling purposes but rather have input and output terminals 30 through 33 for connection to other logic circuits (not shown). The block 10 of several logic circuits illustrates that the tunnel diode logic circuits within the block may or may not be coupled together for signal handling purposes.

Each of the tunnel diode logic circuits in the block 10 includes a tunnel diode which is biased for operation as a bistable circuit, that is, a circuit wherein the tunnel diode is initially at one of its stable conduction states. The diode can be switched to its other stable conduction state by the application thereto of a binary information signal. The tunnel diode will remain in the state to which it has been switched until it is returned to its initial state by the application thereto of a reset pulse signal.

Resetting of the bistable tunnel diode logic circuits in the block 10 is accomplished periodically by the application of an alternating current reset wave or clock pulse wave from a source 36 over a bus 38 and through a coupling capacitor 40 to a reset tunnel diode 42, which preferably is a gallium arsenide tunnel diode. The output of the reset tunnel diode 42 is applied over a bus 44 and through individual reset coupling diodes or asymmetrical coupling elements 46 and coupling resistors 48 to the respective logic tunnel diodes 12 through 16. The coupling elements 46 are preferably silicon conduction diodes.

A second block of several logic circuits 10′ similarly has a reset tunnel diode 42′ associated with it, the reset diode 42′ being similarly coupled to the output of the alternating current reset wave source 36. A third block 10″ of several logic circuits is similarly provided with a reset diode 42″ which is likewise coupled to the output of the reset wave source 36. It will be understood that a computer or data processing apparatus may include a great many blocks of logic circuits each having associated with it a reset diode that is receptive to a reset wave from the source 36.

Figure 2:
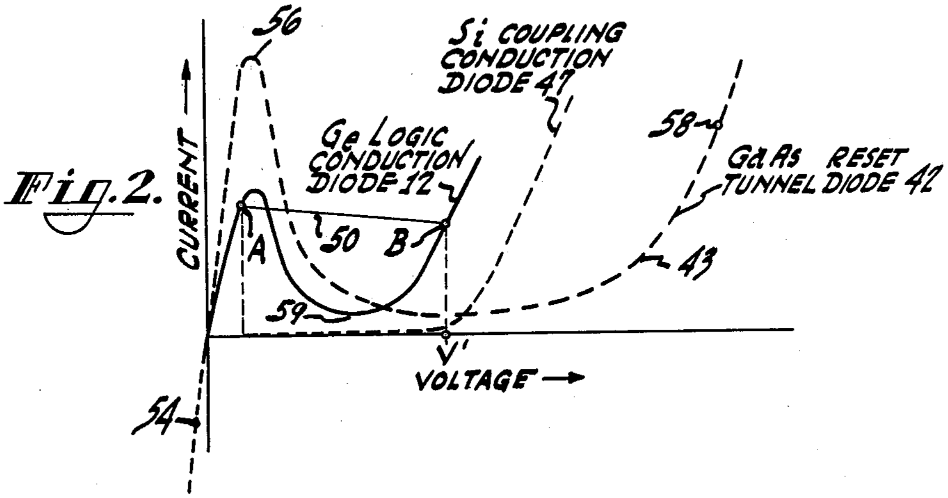
FIGURE 2 is a chart showing the current-voltage characteristic of certain diodes employed in the system of FIGURE 1.

The operation of the combination tunnel diode logic and reset system enclosed by the dotted line 49 in FIGURE 1 will now be described. FIGURE 2 shows a solid line curve representing the current-voltage characteristic of a germanium logic tunnel diode 12. The diode 12 is biased by a current source V so that it has a low voltage stable operating point at A, and a high voltage stable operating point at B. When the diode is at the operating point A, and a binary information signal is applied to the diode, it switches along a dynamic load line, such as 50, to the stable high voltage operating point B. The logic tunnel diode remains at the point B until it is reset to the low voltage point A by the application of a reset pulse to the logic tunnel diode. The curve 43 is the current-voltage wave for the gallium arsenide (GaAs) reset diode 42 plotted on the same scale as the germanium (Ge) logic diode. The curve 47 is the current-voltage curve for the coupling diode 46 which may be a silicon (Si) diode.

Figure 3:
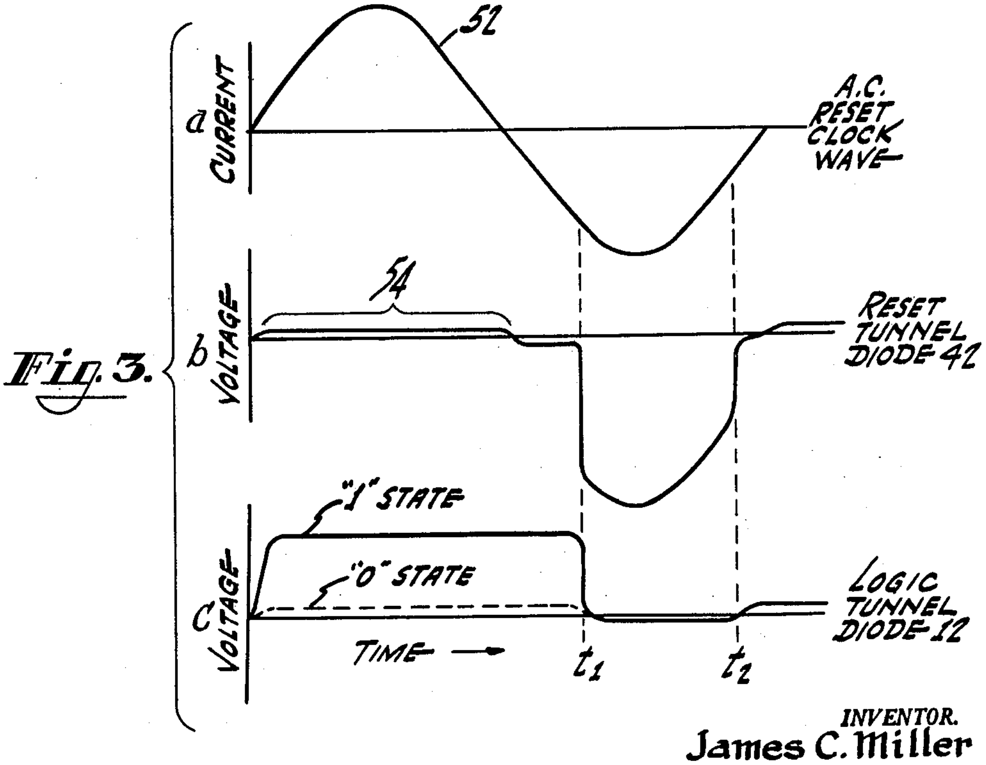
FIGURE 3 shows voltage-time waveforms which will be referred to in describing the operation of the system of FIGURE 1.

FIGURE 3*a* shows a sinusoidal alternating current reset or clock current wave 52 supplied by the source 36 to the reset tunnel diodes 42, 42′ and 42″. It is not essential that reset wave source 36 provide a sinusoidal output wave but such a wave is preferred because it consists of a single frequency component which is easily distributed throughout the computer or data processing apparatus without the distortions and differential phase shifts attendant upon distribution of other wave shapes composed of many different frequency components.

During the positive half cycle of the alternating current reset wave 52 (FIGURE 3*a*), the reset tunnel diode 42 is biased in the reverse direction at a point such as the point 54 on the dashed characteristic curve 46 shown in FIGURE 2. The very small voltage across the reset tunnel diode 42 during this period is similarly labeled 54 on the reset diode voltage waveform of FIGURE 3*b*. During this period, the logic diode 12 may be in either its high voltage "1" state, or it may be in its low voltage "0" state as shown in FIGURE 3*c*. In either case, the coupling diode 46 is substantially nonconducting.

That the coupling diode 46 is substantially nonconducting can be understood by reference to the current-voltage characteristic of the coupling diode 46 as shown by the dotted line in the chart of FIGURE 2. The coupling diode 46 is preferably a silicon conduction diode and is shown to pass very little current in the forward direction until the voltage across it somewhat exceeds the voltage V′. The voltage V′ is approximately the voltage across the coupling diode 46 and is exactly the voltage across the parallel circuit consisting of the germanium logic tunnel diode 12, when the diode 12 is in a high voltage "1" state represented by the operating point B in FIGURE 2. It is also evident from FIGURE 2 that when the logic diode 12 is in its low voltage "0" state represented by the operating point A, the voltage across the coupling diode 46 is much less and the coupling diode presents an even higher impedance.

It is therefore apparent that during the positive half cycle of the alternating current reset wave, substantially no current flows from the terminal 20 of the logic circuit including logic diode 12 to the reset bus 44, and this is so regardless of whether or not the logic diode 12 is in its high voltage state or its low voltage state. The logic diode 12 is effectively isolated from the reset circuit during this interval and the diode will respond to an input binary information signal applied to the input terminal 20.

During the following negative half cycle of the alternating current reset wave 52 applied to reset tunnel diode 42, the diode 42 is increasingly biased in the forward direction until a time $t_1$ is reached when the current of the alternating current reset wave 52 is sufficient to cause the reset diode to switch to its high voltage state. This may be viewed as a movement in FIGURE 2 of the operating point on the characteristic curve of the reset diode 42 from the point 54 up to the peak 56 from which the operating point rapidly switches to a point 58 on the high voltage positive resistance region of the characteristic curve. This rapid switching of the voltage across the reset tunnel diode 42 is represented on the voltage waveform of FIGURE 3*b* at the time $t_1$. The reset tunnel diode 42 remains in the high voltage positive resistance region of its characteristic curve until a time $t_2$ when the alternating current reset wave has decreased sufficiently to cause the reset diode to switch back to its low voltage state.

During the period between the time $t_1$ and $t_2$ when the reset tunnel diode is in its high voltage state, the reset bus 44 is at a corresponding negative voltage with respect to ground. If the logic diode 12 is in the high voltage "1" state when the voltage on the reset bus 44 is made negative as a result of the switching of the reset tunnel diode 42, the coupling diode 46 is rendered conductive and current flows from the bias source V through the resistors 18 and 48, and through the coupling diode 46 to the reset bus 44. The bias voltage source V in combination with the resistor 18 constitutes a constant current source. Therefore an appreciable part of the current flowing in the path including the coupling diode 46 is diverted from the path including the logic diode 12. The current remaining in the logic diode 12 path is less than that of the valley level 59 of the wave 12 of FIGURE 2 and the logic diode rapidly switches from point B to point A. The result is that the logic diode 12 is reset to its low voltage state.

If the logic diode 12 is already in its low voltage state when the reset diode 42 switches, there is no need to reset it and there is not enough voltage difference across the coupling diode 46 to render it conductive. For strictly reset purposes, the coupling circuit may include only resistor 48. The purpose of the silicon coupling diode 46 is to prevent a current drain from the logic diode which would reduce its signal output current needed for driving succeeding logic stages. Stated another way, the silicon coupling diode 46 has characteristics which permit resetting while not reducing the logic gain or fan-out of the logic diode 12. In summary, the coupling circuit 46, 48 requires an asymmetrical element 46 such as a silicon conduction diode or a germanium tunnel rectifier which is in the high impedance condition for the operating range of the logic diode, but which goes into its low impedance condition when the reset diode switches to its high state and superimposes an additional voltage difference across the coupling element.

The foregoing explanation of the operation of the reset diode 42 in resetting the logic diode 12 applies also, of course, to the simultaneous resetting of the other logic diodes 13 through 16 in the block 10 of logic circuits. A gallium arsenide tunnel diode is preferred for use as the reset diode 42 because it has a high current characteristic compared with that of the germanium logic diodes (see FIGURE 2). There is a limit to the number of logic circuits which can be reset by a single gallium arsenide reset tunnel diode 42. This comes about from the fact that, during the negative half cycle of the alternating current reset wave 52, current flows from the logic diodes through the coupling diode 46 to the reset bus 44 and thence to the source represented by the relatively high impedance of the capacitor 40 and the alternating current bus 38. The currents flowing from the logic circuits (including diodes 12 through 16) through the respective coupling diodes 46 to the reset bus 44 subtract from the current flowing up through the gallium arsenide reset diode 42. If too many logic circuits are connected for reset purposes to the reset bus 44, the sum of the currents from the coupling diodes 46 reduces the current through the associated reset diode 42 to such an extent that it is prematurely switched from its high voltage state back to its low voltage state, or is even prevented from switching to the high voltage state in the first instance. On the other hand, if the reset diode 42 is employed to reset only one logic diode, the reset diode 42 need not be a gallium arsenide tunnel diode but may be a germanium tunnel diode like the logic diode.

The manner in which the logic circuits in the blocks 10′ and 10″ are reset by their respective reset diodes 42′ and 42″ is the same as has been described in connection with block 10 and reset diode 42.

FIGURE 4 shows a combination tunnel diode logic and reset circuit which may be substituted for the circuit 49 in the system of FIGURE 1. A tunnel diode 60 and an inductor 62 are connected in series between the terminals —V and ground of a direct current bias source (not shown) to provide a monostable circuit. The junction 64 between the diode and inductor is coupled through a resistor 65 (or through a capacitor like capacitor 40 in FIGURE 1) to an input terminal 38′ which may be the alternating current bus 38 of FIGURE 1, or may be a source of a logically derived reset pulse. The junction 64 is also connected to the reset bus 44. The remainder of the circuit of FIGURE 4 is the same as that within the dotted line enclosure 49 of FIGURE 1.

In the operation of the circuit of FIGURE 4, the reset tunnel diode 60 remains in its low voltage state or in a reverse biased state during the application thereto over bus 38 and terminal 38′ of the positive half cycle of the alternating current wave from source 36 in FIGURE 1. When the negative half cycle of the alternating current wave is applied, the reset tunnel diode 60 is increasingly forward biased until it switches to its high voltage state. The circuit is monostable by virtue of the reactive effect of the inductor 62, so that the diode returns to its low voltage state after a time interval determined by the values of the circuit elements. The time interval is quite independent of the duration of the alternating current wave which provides the initial triggering of the circuit. During the time that reset diode is in its high voltage state, it acts to reset the logic diodes to which it is coupled in the same manner as has been described in connection with the system of FIGURE 1.

The circuit of FIGURE 4 operates in a similar manner when an asynchronous logically derived negative reset pulse is applied to the input terminal 38′.

It will be understood that while specific embodiments of the invention have been described as including certain preferred types of diode elements, this has been done for purposes of illustration, rather than limitation. Alternative equivalent elements may be employed so long as their pertinent characteristics are related to each other in the manner generally illustrated in FIGURE 2.

It is apparent that according to the teachings of this invention there is provided an improved combination logic and reset circuit, and a system of resetting tunnel diode logic circuits in a manner which greatly simplifies the problem of distributing very high frequency reset or clock signals to a large number of tunnel diode logic circuits in a computer or data processing apparatus.

What is claimed is:

1. A logic system for use in a computer or the like comprising a plurality of logic circuit blocks, each of said blocks including several logic circuits, each of said logic circuits including a negative resistance element arranged to be biased by a direct current source to operate in a bistable manner and switch from one state to another in response to a switching signal, and means to periodically reset said negative resistance elements to an initial one of said states, said means including a reset diode associated with each of said blocks, all of said reset diodes being arranged to receive an alternating current reset wave from a source, and coupling diodes coupled from each reset diode to respective ones of said negative resistance elements in the associated block.

2. A logic system for use in a computer or the like comprising a plurality of logic circuit blocks, each of said blocks including several logic circuits, each of said logic circuits including a tunnel diode arranged to be biased by a direct current source to operate in a bistable manner and switch from one state to another in response to a switching signal, and means to periodically reset said logic tunnel diodes to the initial state, said means including a reset tunnel diode associated with each of said blocks, all of said reset diodes being arranged to receive an alternating current reset wave from a source, and conduction coupling diodes coupled from each reset diode to respective ones of said logic tunnel diodes in the associated block.

3. A logic system for use in a computer or the like comprising a plurality of logic circuit blocks, each of said blocks including several logic circuits, each of said logic circuits including a germanium tunnel diode arranged to be biased by a direct current source to operate in a bistable manner and switch from one state to another in response to a switching signal, and means to periodically reset said logic circuits to the original state, said means including a gallium arsenide reset tunnel diode associated with each of said blocks, all of said reset diodes being arranged to receive an alternating current reset wave from a source, and silicon conduction coupling diodes coupled from each reset diode to respective ones of said negative resistance elements in the associated block.

4. A logic system for use in a computer or the like comprising a plurality of logic circuit blocks, each of said blocks including several logic circuits, each of said logic circuits including a negative resistance element arranged to be biased by a direct current source to operate in a bistable manner and switch from one state to another in response to a switching signal, and means to periodically reset said negative resistance elements to the initial state, said means including a reset diode associated with each of said blocks, all of said reset diodes being arranged to receive a substantially sinusoidal alternating current reset wave from a source, and coupling diodes coupled from each reset diode to respective ones of said negative resistance elements in the associated block.

5. A logic system for use in a computer or the like comprising a plurality of logic circuit blocks, each of said blocks including several logic circuits, each of said logic circuits including a germanium tunnel diode arranged to be biased by a direct current source to operate in a bistable manner and switch from one state to another in response to a switching signal, and means to periodically reset said logic circuits to the initial state, said means including a reset gallium arsenide tunnel diode associated with each of said blocks, a source of a sinusoidal alternating current reset wave coupled to all of said reset diodes, and conduction coupling diodes coupled from each reset diode to respective ones of said logic circuits in the associated block.

6. The combination of several logic circuits each including a tunnel diode arranged to be biased by a direct current source to operate in a bistable manner and switch from one state to another in response to a switching signal, and means to periodically reset said logic circuits to the initial state, said means including a reset tunnel diode arranged to receive an alternating current reset wave, and conduction coupling diodes coupled from said reset diode to respective ones of said logic circuits.

7. The combination of several logic circuits each including a negative resistance element arranged to be biased by a direct current source to operate in a bistable manner and switch from one state to another in response to a switching signal, and means to periodically reset said negative resistance elements to the initial state, said means including a reset diode, a source of a sinusoidal alternating current reset wave coupled to said reset diode, and coupling diodes coupled from said reset diode to respective ones of said negative resistance elements.

8. The combination of a plurality of logic circuits each including a negative resistance element arranged to be biased by a direct current source to operate in a bistable manner and switch from an initial state to another state in response to an information signal, and means to periodically reset said negative resistance elements to the initial state, said means including a monostable circuit including a negative resistance reset diode, a source of an alternating current reset wave coupled to said reset diode to cause it to switch from its low voltage state to its high voltage state and back again, and coupling diodes coupled from said reset diode to respective ones of said negative resistance elements.

9. The combination of a bistable negative resistance diode logic circuit including a logic diode and having first and second stable states, a reset negative resistance diode having first and second states, said logic and reset diodes being normally in their first states, a coupling from said reset diode to said logic diode including a coupling diode, means to apply a binary information signal to said logic diode to cause it to switch from its first state to its second state, said diodes and circuit elements being selected so that said coupling diode is substantially non-conductive so long as said reset diode is in its first state, and means to apply a reset signal to said reset diode to cause it to switch from its first state to its second state, whereby the coupling diode is rendered conductive and said logic diode is reset to its first state.

10. The combination of a bistable tunnel diode logic circuit including a logic diode and having first and second stable states, a reset tunnel diode having first and second states, said logic and reset diodes being normally in their first states, a coupling from said reset diode to said logic diode including an asymmetrical coupling element having high and low conduction conditions, means to apply a binary information signal to said logic diode to cause it to switch from its first state to its second state, said diodes and circuit elements being selected so that said coupling element is substantially non-conductive so long as said reset diode is in its first state, and means to apply a reset signal to said reset diode to cause it to switch from its first state to its second state, whereby the coupling element is rendered conductive and said logic diode is reset to its first state.

11. The combination of a bistable tunnel diode logic circuit including a logic diode and having low voltage and high voltage stable states, a reset tunnel diode having low voltage and high voltage states, said logic and reset diodes being normally in their low voltage states, a coupling from said reset diode to said logic diode including a coupling diode, means to apply a binary information signal to said logic diode to cause it to switch to its high voltage state, said diodes and circuit elements being selected so that said coupling diode is substantially non-conductive so long as said reset diode is in its low voltage state, and means to apply a reset signal to said reset diode to cause it to switch to its high voltage state, whereby the coupling diode is rendered conductive and said logic diode is reset to its low voltage state.

12. The combination of a bistable tunnel diode logic circuit including a logic diode and having low voltage and high voltage stable states, a reset tunnel diode having low voltage and high voltage states, said logic diode being normally in its low voltage state and said reset diode being normally not forward biased, a coupling from said reset diode to said logic diode including a coupling diode, means to apply a binary information signal to said logic diode to cause it to switch to its high voltage state, said diodes and circuit elements being selected and poled so that said coupling diode is forward biased but is substantially non-conductive so long as said reset diode is not forward biased, and means to apply a negative going forward biasing reset signal to said reset diode to cause it to switch to its high voltage state, whereby the coupling diode is rendered conductive and said logic diode is reset to its first state.

13. The combination of a bistable negative resistance diode logic circuit including a logic diode and having first and second stable states, a bistable negative resistance diode reset circuit having first and second stable states, said logic and reset diodes being normally in their first states, a coupling from said reset diode to said logic diode including a coupling diode, means to apply a binary information signal to said logic diode to cause it to switch from its first state to its second state, said diodes and circuit elements being selected so that said coupling diode is substantially non-conductive so long as said reset diode is in the first state, and means to apply a reset signal to said reset diode to cause it to switch from its first state to its second state, whereby the coupling diode is rendered conductive and said logic diode is reset to its first state.

14. The combination of a bistable tunnel diode logic circuit including a logic diode and having first and second stable states, a bistable tunnel diode reset circuit including a reset diode and having first and second stable states, said logic and reset diodes being normally in their first states, a coupling from said reset diode to said logic diode including a coupling diode, means to apply a binary information signal to said logic diode to cause it to switch from its first state to its second state, said diodes and circuit elements being selected so that said coupling diode is substantially non-conductive so long as said reset diode is in the first state, and means to apply a reset signal to said reset diode to cause it to switch from its first state to its second state, whereby the coupling diode is rendered conductive and said logic diode is reset to its first state.

15. A logic system for use in a computer or the like comprising a plurality of logic circuit blocks, each of said blocks including several logic circuits, each of said logic circuits including a logic diode, said logic diodes having like current-voltage characteristics and each being arranged to be biased by a direct current source to operate in a bistable manner and switch from an initial state to another state in response to a switching signal, and means to periodically reset said logic diodes to the initial state, said means including a reset diode associated with each of said blocks, said reset diodes having a current-voltage characteristic with a higher current peak than said logic diodes, all of said reset diodes being arranged to receive an alternating current reset wave from a source, and coupling diodes coupled from each reset diode to respective ones of said logic diodes in the associated block.

References Cited in the file of this patent

UNITED STATES PATENTS

| | | |
|---|---|---|
| 2,944,164 | Odell et al. | July 5, 1960 |
| 2,966,599 | Haas | Dec. 27, 1960 |

OTHER REFERENCES

IBM Technical Disclosure Bulletin, vol. 2, No. 6, April 1960, page 102, "RC Coupled Tunnel Diode Shift Register," Gruodis.